United States Patent [19]

Link

[11] Patent Number: 4,540,079
[45] Date of Patent: Sep. 10, 1985

[54] MULTIPLE DISK CLUTCH FOR MOTOR VEHICLES

[75] Inventor: Achim Link, Schweinfurt, Fed. Rep. of Germany

[73] Assignee: Fichtel & Sachs AG, Schweinfurt, Fed. Rep. of Germany

[21] Appl. No.: 545,755

[22] Filed: Oct. 26, 1983

[30] Foreign Application Priority Data

Oct. 28, 1982 [DE] Fed. Rep. of Germany ....... 3239962

[51] Int. Cl.³ ................ F16D 13/69; F16D 13/71
[52] U.S. Cl. .................. 192/109 R; 192/70.13; 192/70.28
[58] Field of Search ........... 192/109 R, 109 A, 70.25, 192/70.13, 66, 70.2, 89 B

[56] References Cited

U.S. PATENT DOCUMENTS 3,209,875 10/1965 Altmann ................. 192/66
3,887,051 6/1975 Bignell ............... 192/109 R
4,339,023 7/1982 Maycock .............. 192/70.25

FOREIGN PATENT DOCUMENTS 2656626 6/1977 Fed. Rep. of Germany .
867268 10/1941 France ............... 192/109 R
1179670 1/1970 United Kingdom .
1233968 6/1971 United Kingdom .
1365613 9/1974 United Kingdom .

Primary Examiner—Leonard E. Smith
Assistant Examiner—Jane E. Obee
Attorney, Agent, or Firm—Toren, McGeady, Stanger, Goldberg & Kiel

[57] ABSTRACT

A multiple disk clutch for motor vehicles comprises a flywheel (1), a clutch housing (7) which is firmly connected with an intermediate ring (9) arranged between the clutch housing (7) and the flywheel (1). The securing of the intermediate ring (9) to the clutch housing (7) is independent of the securing of this unit to the flywheel (1). This unit encloses a presser plate (19), an intermediate disk (15) between the flywheel (1) and the presser plate (19), a clutch disk (11) between the presser plate (19) and the intermediate disk (15) and a clutch disk (13) between the intermediate disk (15) and the flywheel (1). A dished spring (23) presses the presser plate (19) towards the flywheel (1). The presser plate (19) is guided non-rotatably but axially displaceably on the clutch housing (7). The intermediate disk (15) is guided non-rotatably but axially displaceably on the intermediate ring (9). In order to avoid damage to these guides, formed especially as tangential leaf springs, the intermediate disk (15) carries stop noses (39) on its external circumference which engage in apertures (35) of the intermediate ring (9) and take up the initial stress force of the dished spring (23), as long as the clutch housing (7) is not fitted on the flywheel (1).

6 Claims, 3 Drawing Figures

MULTIPLE DISK CLUTCH FOR MOTOR VEHICLES

BACKGROUND OF THE INVENTION

The invention relates to a multiple disk clutch for motor vehicles and especially a two-disk clutch in which the thrust plate unit, consisting of clutch housing, presser plate, intermediate disk, at least one clutch disk and the spring, is detachably secured to a flywheel.

STATEMENT OF PRIOR ART

From German Pat. No. 26 56 626 a two-disk clutch for motor vehicles is known the clutch housing of which is secured by means of screws detachably to the flywheel which is driven by the internal combustion engine of the motor vehicle. In the clutch housing a presser plate is arranged and axially between the presser plate and the flywheel an intermediate disk is arranged. Both the presser plate and the intermediate disk are guided non-rotatably but axially displaceably on the clutch housing. Between the presser plate and the intermediate disk a first clutch disk is arranged and between the intermediate disk and the flywheel a second clutch disk is arranged. The clutch disks are seated non-rotatably but axially displaceably on an input shaft of the motor vehicle gears. A dished spring stressed in between the clutch housing and the presser plate presses the presser plate and thus the intermediate disk axially against the flywheel. For the non-rotatable but axially displaceable connection both of the presser plate and of the intermediate disk with the clutch housing, tangential leaf springs are provided.

The thrust plate unit is ordinarily supplied as a complete construction unit for fitting to the flywheel of the motor vehicle. As long as the thrust plate unit is not secured to the flywheel the great initial stress force of the dished spring must be taken up by the tangential leaf springs of the thrust plate and the intermediate disk. This can lead to damage to the tangential leaf springs. There is also the fact that the clutch disk adjacent to the flywheel and also the intermediate disk are frequently pushed by the dished spring so far out of the clutch housing that problems can arise in the securing and centring of the clutch housing on the flywheel.

OBJECT OF THE INVENTION

An object of the invention is to improve a multiple disk clutch of the above-stated kind so that the thrust plate unit can be fitted more easily and so that furthermore when the thrust plate unit is removed from the flywheel damage to the guide elements of the presser plate and the intermediate disk by reason of the initial stress force of the clutch springs is avoided.

SUMMARY OF THE INVENTION

In a multiple-disk clutch according to the invention at least one first stop facing the flywheel is provided on the intermediate disk and at least one oppositely directed second stop arranged in the axial displacement path of the first stop is provided on the clutch housing or a component firmly connected with the clutch housing independently of its disengageable flywheel fastening. The stops limit the displacement travel of the intermediate disk and thus also of the presser plate in relation to the clutch housing, when the thrust plate unit is removed from the flywheel, to values which cannot become dangerous to the guides of the intermediate disk and the presser plate. The axial interval of the two stops for this purpose is made smaller than the interval of the intermediate disk from the flywheel determined by the second clutch disk. If the thrust plate unit is secured to the flywheel, the stops lift away from one another, since the intermediate disk is now supported through the friction linings of the second clutch disk on the flywheel. The axial interval of the two stops is dimensioned so that within the permissible limits of wear of the friction linings of the clutch disks and of the parts co-operating therewith, the stops are not in abutment with one another.

The stops provided on the intermediate disk can be formed as additional components, for example in the form of threaded bolts or the like, which are installed with the intermediate disk inserted into the clutch housing. However the first stops are expediently formed integrally on the intermediate disk, especially in the form of noses protruding radially from the circumference of the intermediate disk. The second stops are formed preferably as faces of radial recesses pointing axially away from the flywheel, which recesses are formed by the clutch housing in common with an axially adjoining intermediate ring arranged between it and the flywheel. The intermediate ring is rigidly connected into one unit with the clutch housing, especially screwed together, irrespective of the securing of this unit to the flywheel.

For the non-rotatable but axially displaceable guidance of the presser plate and the intermediate disk on the clutch housing again tangential leaf springs are preferably provided. The tangential leaf springs of the intermediate disk are however expediently not secured directly to the clutch housing but are secured to the intermediate ring firmly connected with the clutch housing. The intermediate disk and the intermediate ring in this manner can be preassembled and adjusted and tested independently of the presser plate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
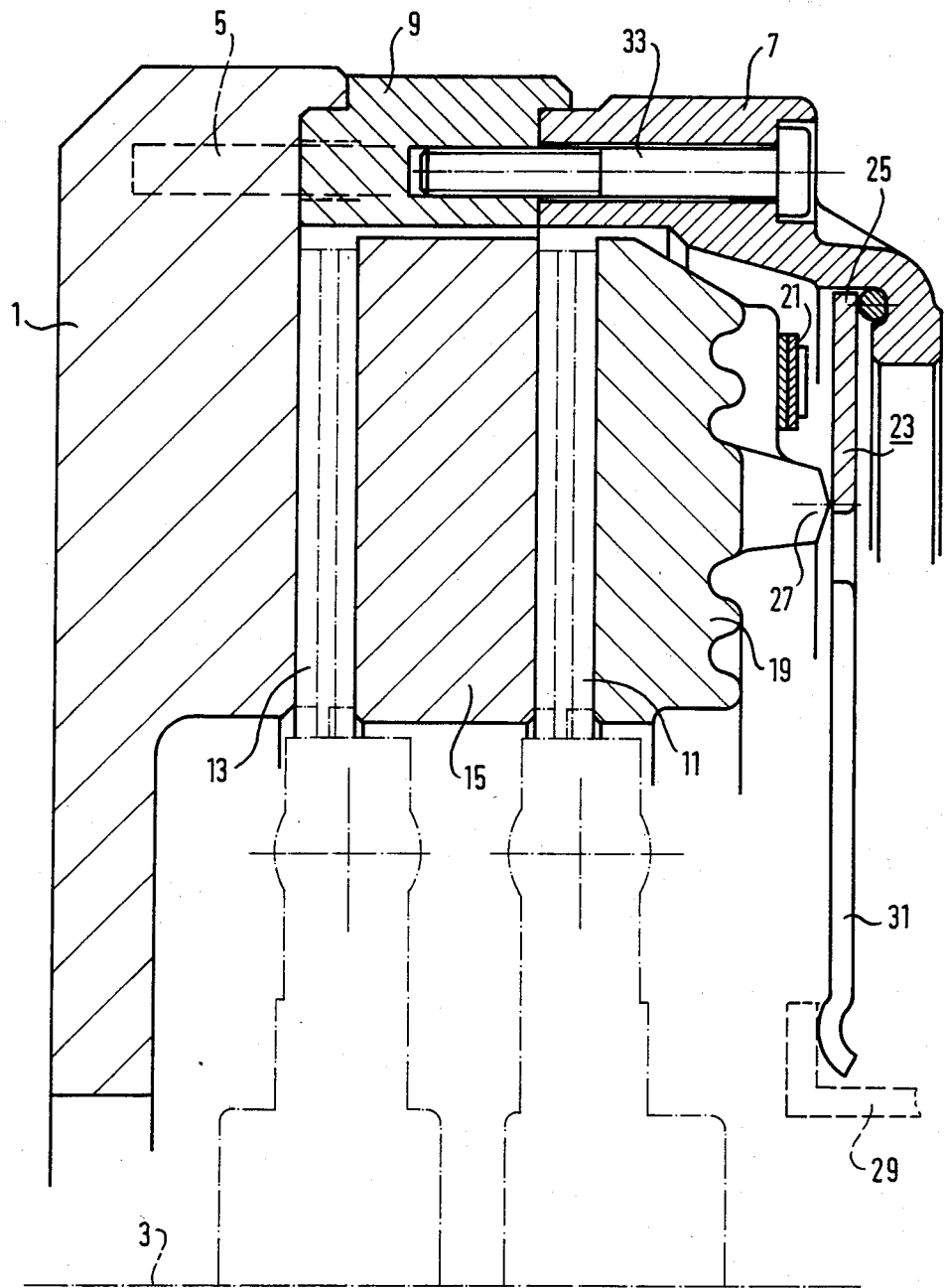
FIG. 1 shows a partial diagrammatic axial longitudinal section through one half of a two-disk friction clutch of a motor vehicle.
Figure 3:
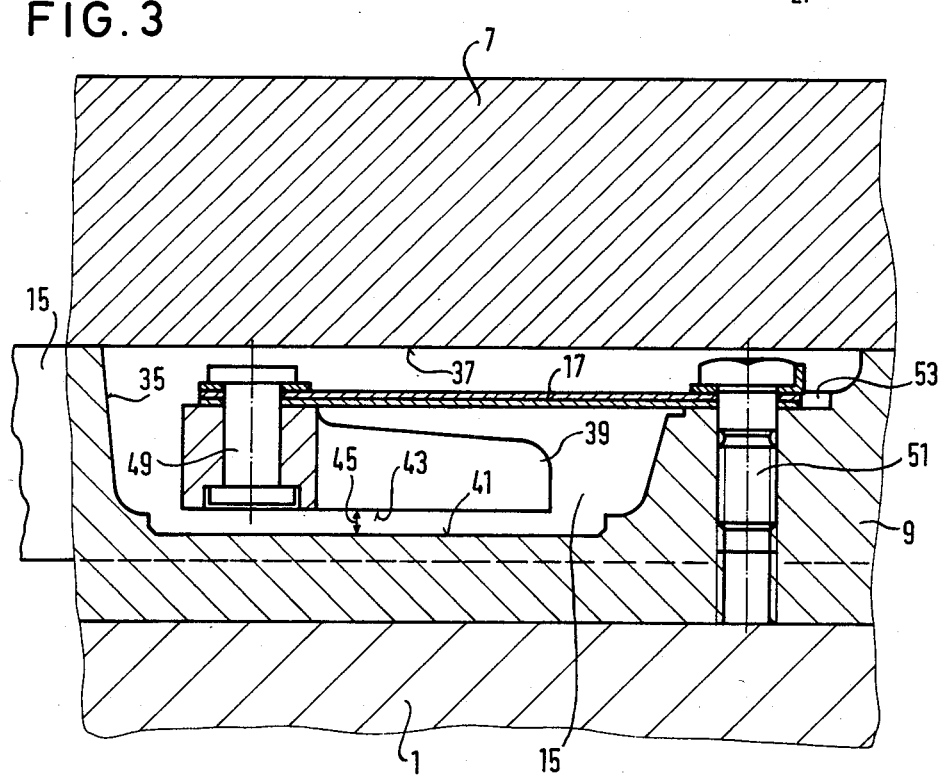

A two-disk friction clutch as illustrated in FIG. 1 comprises a flywheel 1 mounted on a crank shaft (not shown) of the internal combustion engine of the motor vehicle, which flywheel is driven by the internal combustion engine about a rotation axis 3. A clutch housing 7 is secured to the flywheel 1 by means of a plurality of axial threaded bolts 5 distributed in the circumferential direction. Axially between the flywheel 1 and the clutch housing 7 an intermediate ring 9 is coaxially seated. Within the space enclosed by the clutch housing 7 and the intermediate ring 9 there are arranged two clutch disks 11, 13 provided with torsion dampers (not shown further), which disks are connected non-rotatably but axially displaceably with an input shaft (not shown further) of a gear of the motor vehicle. Axially between the clutch disks 11, 13 there is seated an annular intermediate disk 15 which is guided non-rotatably but axially displaceably on the intermediate ring 9 by means of a plurality of tangential leaf springs 17 distributed in the circumferential direction (FIG. 3). On the side of the clutch disk 11 remote from the intermediate ring 15 and the flywheel 1 there is arranged a presser plate 19 of annular disk form which is likewise guided non-rotatably but axially displaceably on the clutch housing 7 through a plurality of tangential leaf springs 21 distributed in the circumferential direction. Between the presser plate 19 and the clutch housing 7 there is stressed a diaphragm spring or dished spring 23 which initially stresses the presser plate 19 towards the flywheel 1. The presser plate 19 is here supported through the friction linings of the clutch disk 11, the intermediate disk 15, the friction linings of the clutch disk 13 on the flywheel 1. FIG. 1 shows a drawn friction clutch in which the dished spring 23 is supported at its external circumference 25 on the clutch housing 7. The presser plate 19 rests with noses 27 on a diameter of the dished spring 23 placed further inwards. The two-disk clutch as illustrated in FIG. 1 in the engaged condition is disengaged by means of a releaser 29. The releaser 29 acts upon radially inwardly extending tongues 31 of the dished spring 23 and relieves the presser plate 19 when the releaser is drawn away from the flywheel 1. Alternatively, the two-disk friction clutch can however also be formed as a pressed clutch.

Figure 2:
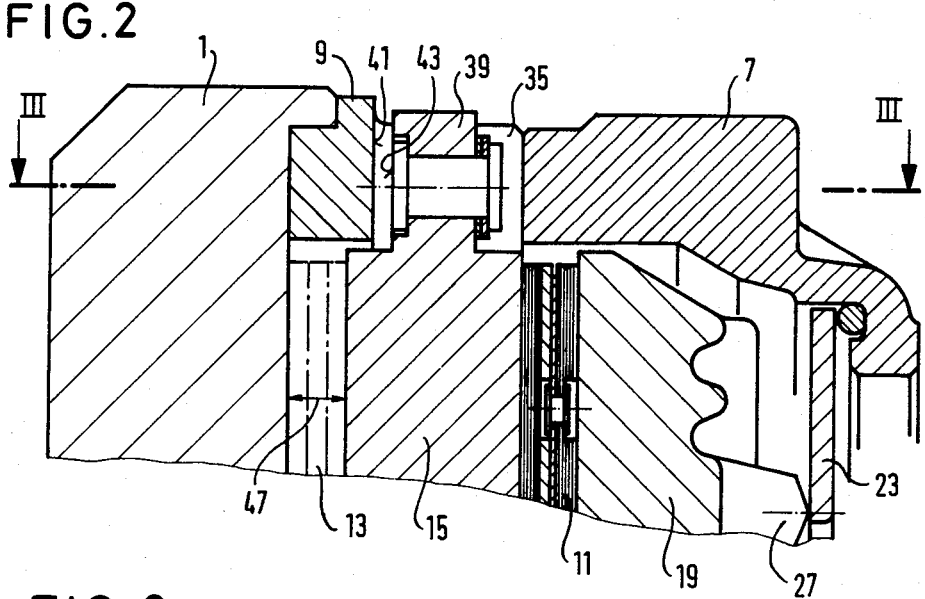
FIG. 2 shows a further axial longitudinal section through the friction clutch according to FIG. 1, at an angle offset in relation to the section plane of FIG. 1, and FIG. 3, shows a sectional view through the friction clutch seen along a line III—III in FIG. 2.

The intermediate ring 9 is screwed by means of screws 33 (FIG. 1) to the clutch housing 7. The screws 33 are provided in addition to the screws 5 which secure the clutch housing 7 to the flywheel 1, and connect the clutch housing 7 and the intermediate ring 9 into a unit which can be handled independently of the flywheel 1. As may best be seen from FIGS. 2 and 3, in the intermediate ring 9 there are formed radially through-passing apertures 35 which are open to the clutch housing 7 and defined by a flat end face 37 of the clutch housing 7. Radial noses 39 formed integrally on the external circumference of the intermediate disk 15 protrude into the apertures 35, several of which are provided in distribution over the circumference of the intermediate ring 9. On the side axially opposite to the surface 37 of the clutch housing 7 the aperture 35 forms a flat abutment face 41 extending perpendicularly of the axis of rotation. The abutment face 41 faces axially away from the flywheel 1. A flat abutment face 43, extending perpendicularly of the rotation axis likewise, of the nose 39 lies opposite to the abutment face 41. The axial interval of the abutment faces 41, 43, designated by an arrow 45, is made smaller than the friction face interval of the flywheel 1 from the intermediate disk 15, which is indicated by an arrow 47 and determined by the thickness of the friction linings of the clutch disk 13 on the flywheel side. When the clutch is assembled the abutment faces 41, 43 are spaced from one another. The distance 45 is here dimensioned so that with permissible wear of the friction linings of the clutch disk 13 the abutment faces 41, 43 do not come to abut on one another. The clutch housing 7 together with the intermediate ring 9 secured to it, the intermediate disk 15 guided on this unit, the clutch disk 11, the presser plate 19 guided on this unit and the dished spring 23, form a thrust plate unit ready for installation. As long as this thrust plate unit is not fitted on the flywheel 1, the abutment faces 41, 43 lie against one another and the initial stress force of the dished spring 23 is taken up through the presser plate 19, the friction linings of the clutch disk 11, the intermediate disk 15 and its noses 39, by the intermediate ring 9 secured to the clutch housing 7. Thus there is no fear of damage to the tangential leaf springs 17 and 21.

The intermediate disk 15 is secured through its tangential leaf springs 17 to the intermediate ring 9 so that this unit can be examined and adjusted before assembly of the thrust plate unit. The tangential leaf springs 17 for this purpose are secured on the side axially remote from the flywheel 1 with one end by means of rivets 49 to the noses 39 of the intermediate disk 15. They extend substantially completely within the aperture 35 of the intermediate ring 9 and are secured with their other end within the aperture 35 by means of screws 51 to the intermediate ring 9. The end of the leaf spring nearer the intermediate ring is here seated in an aperture 53 adapted to the form of the leaf spring 17 and sunk additionally into the aperture 35.

While specific embodiments of the invention have been shown and described in detail to illustrate the application of the inventive principles, it will be understood that the invention may be embodied otherwise without departing from such principles.

What is claimed is:

1. A multiple disk clutch for motor vehicles, comprising:
   (a) a flywheel;
   (b) a clutch housing secured detachably to the flywheel;
   (c) a presser plate guided non-rotatably but axially displaceably on the clutch housing;
   (d) an intermediate disk guided non-rotatably but axially displaceably on the clutch housing, axially between the flywheel and the presser plate;
   (e) two clutch disks of which the first disk is arranged axially between the presser plate and the intermediate disk and the second disk is arranged axially between the intermediate disk and the flywheel;
   (f) at least one spring stressed in between the presser plate and the clutch housing and resiliently stressing the presser plate axially towards the flywheel;
   (g) at least one first stop facing the flywheel provided on the intermediate disk; and
   (h) at least one oppositely directed second stop arranged in the axial displacement path of the first stop provided on the clutch housing or a component firmly connected with the clutch housing independently of its disengageable flywheel fastening, the axial interval of the two stops being smaller than the spacing of the intermediate disk from the flywheel which is determined by the second clutch disk.

2. A clutch according to claim 1, wherein an intermediate ring enclosing the intermediate disk is arranged axially between the clutch housing and the flywheel and is firmly connected with the clutch housing independently of the flywheel fastening of the clutch housing wherein the intermediate ring and the clutch housing in common define at least one radial aperture the surface of which, facing axially away from the flywheel and formed by the intermediate ring forms the second stop, and wherein on the circumference of the intermediate disk there is arranged at least one radially protruding nose which engages in the aperture and forms the first stop.

3. A clutch according to claim 2, wherein the leaf springs are secured on the side of the noses axially remote from the flywheel.

4. A clutch according to claim 2, wherein the aperture is formed in the intermediate ring and wherein the clutch housing limits the aperture with a flat face.

5. A clutch according to claim 2, wherein the intermediate disk is connected non-rotatably but axially displaceably with the clutch housing by means of approximately tangentially extending leaf springs, each leaf spring being secured with one end to one of the noses of the intermediate disk and being arranged substantially within the radial aperture limited by the intermediate ring and the clutch housing.

6. A clutch according to claim 5, wherein the leaf springs are each secured by their other ends to the intermediate ring.

* * * * *